Patented Nov. 27, 1945

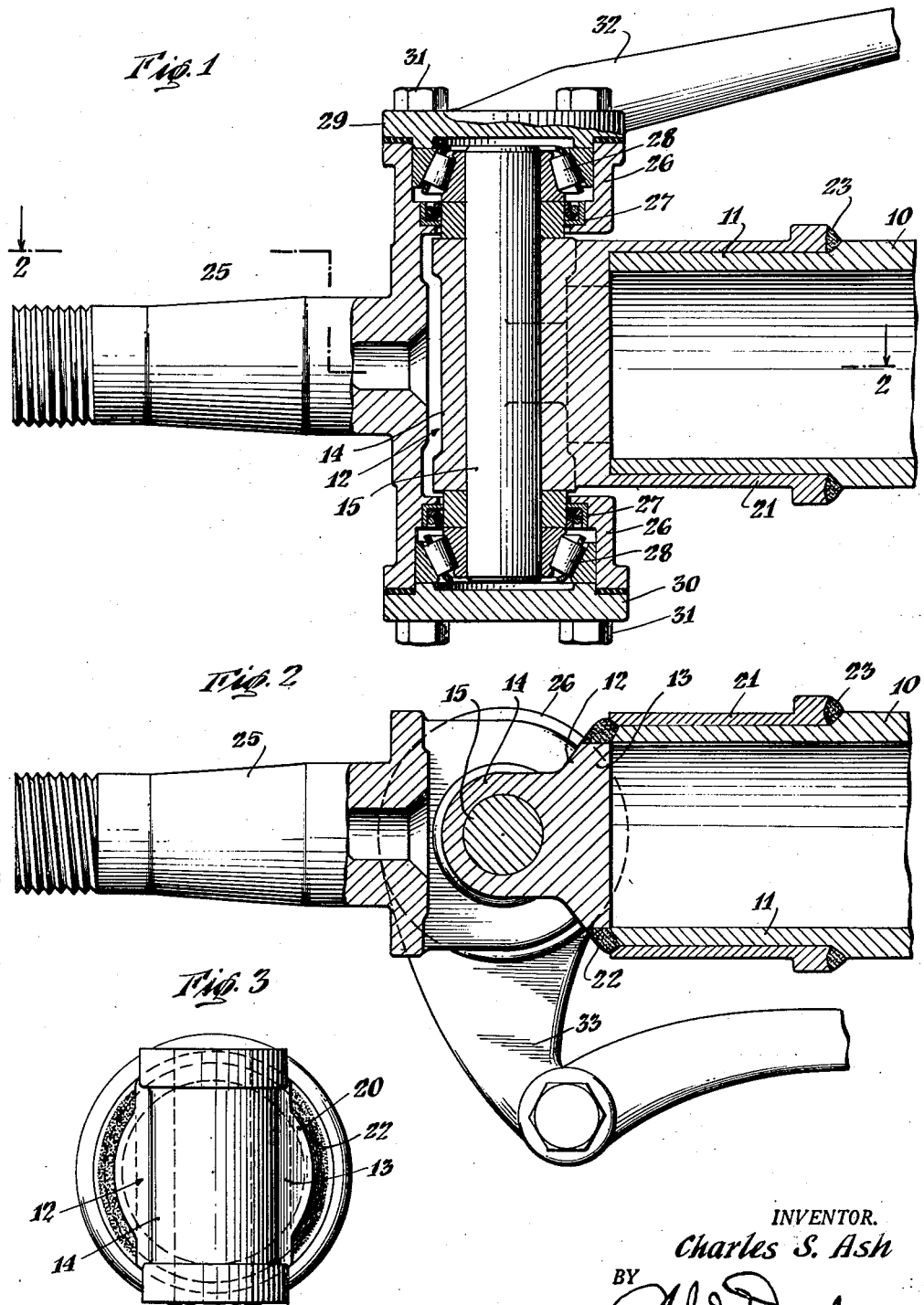

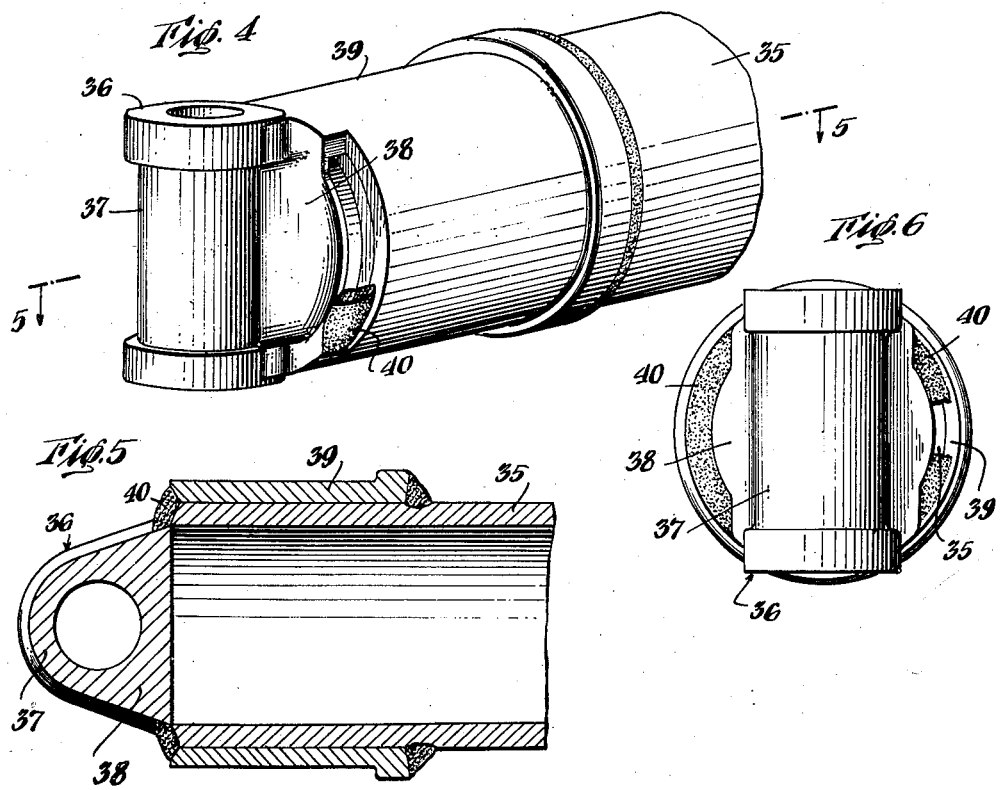

2,389,712

UNITED STATES PATENT OFFICE 2,389,712

VEHICLE AXLE

Charles S. Ash, Milford, Mich.

Application September 24, 1943, Serial No. 503,608

6 Claims. (Cl. 301—124)

The present invention relates to vehicle axles, and more particularly to axles for the front or steering end of vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate embodiments of the invention, and together with the description, serve to explain the principles of the invention.

Of the drawings:

Fig. 1 is a vertical cross-sectional view of the end assembly of a front or steering axle for a vehicle embodying the present invention;

Fig. 2 is a horizontal cross-sectional view taken along line 2—2 of Fig. 1;

Fig. 3 is an end elevation of the assembly shown in Fig. 1, the spindle and yoke arms being omitted;

Fig. 4 is a perspective view of the end assembly of a front or steering vehicle axle comprising a modified embodiment of the present invention;

Fig. 5 is a horizontal cross-sectional view taken along line 5—5 of Fig. 4;

Fig. 6 is an end elevation of the vehicle axle assembly shown in Fig. 4.

It is an object of the present invention to provide a front or steering vehicle axle assembly which is lighter and stronger than conventional axle assemblies and which is more economical and simpler to build. Another object of the invention is to provide such an axle assembly which may be built with a minimum of special tooling equipment. The invention further provides a front or steering axle construction of a design more flexible as to specifications than conventional axles.

Referring now in detail to the illustrative embodiments of the present invention as shown by way of example in the accompanying drawings, and referring first to the embodiment of Figs. 1 to 3 inclusive, a front or steering vehicle axle may comprise a tubular axle beam 10 having a reduced end portion 11 for mounting a steering spindle assembly.

The steering assembly of the present embodiment comprises a steering knuckle member indicated generally by the numeral 12. The knuckle 12 has a rectangularly shaped base portion 13 with rounded ends and a rounded outwardly extending portion 14 integral with said base portion, the rounded portion 14 being provided with a vertical cylindrical bore to receive a king pin 15. Thickened strengthening portions 20 are made integral with the knuckle 12 between the portions 13 and 14.

A cylindrical collar 21 is provided integral with the knuckle member 12 for securing the knuckle to the tubular axle 10. The base portion 13 of knuckle member 12 is long enough to cover off the end of axle 10 and collar 21 in a vertical direction, but horizontally the base 13 is somewhat narrower than the outside diameter of reduced end 11 of axle 10. Apertures are thereby provided in which lines of welding 22 may be made in order to securely join the axle 10 with the integral knuckle 12 and the collar 21. The knuckle and collar unit is preferably a drop forging or steel casting as desired.

In assembling the axle beam, knuckle member and collar unit the latter is heated and pressed onto the reduced end portion 11 and then shrunk to fix it securely in position. The axle 10 and the collar and knuckle unit are then securely joined together by lines of welding 22 and a circular weld 23 at the inner end of the collar 21.

The assembly at the end of the tubular axle 10 may comprise further the spindle 25 for mounting a wheel or wheels. The spindle 25 has yoke arms 26 having vertically disposed apertures to accommodate the king pin 15. Relatively thick washer members 27 position the king pin in the yoke arms and roller bearings 28 are provided to allow easy steering movement of spindle 25.

Cap members 29 and 30 are secured to the top and bottom yoke arms 26 respectively by means of tap bolts 31, and are provided respectively with a conventional steering arm 32 and tie rod connection 33.

In Figs. 4 to 6 inclusive are shown a modified embodiment of the present invention having a tubular axle member 35. A knuckle member 36 has a substantially cylindrical outer portion 37 and a thickened inner base portion 38 having a flat inner side. A collar member 39 is provided integral with knuckle 36 for securing the knuckle to the axle 35.

The base portion 38 of the knuckle 36 is not wide enough horizontally to cover off the ends of collar 39 and axle 35, this leaving openings at either side of the knuckle uncovering the end of axle 35. Lines of welding 40 on either side are utilized to securely hold the collar and knuckle unit and the axle in assembled relation and to completely close off the end of the tubular axle.

As described in connection with the embodiment of Figs. 1 to 3, the knuckle and collar unit may be a drop forging or steel casting. The knuckle and collar unit is heated and pressed onto the end of axle 35 in assembling the members and cooled to secure it in position. Thereafter the lines of welding 40 are applied to secure the knuckle and collar unit and the axle 35 to each other.

The invention in its broader aspects is not limited to the specific mechanism shown and described but departures may be made therefrom within the scope of the accompanying claims without departing from the principles of the invention and without sacrificing its chief advantages.

What I claim is:

1. A steering vehicle axle comprising a tubular beam member, and knuckle units at either end of said beam member, each said unit comprising a king pin holding portion and an integral closing plate and collar portion positioned over an end of said beam member, said collar portion being secured to said beam by welding at the end of the beam, said plate also serving to close the tubular beam end.

2. A steering vehicle axle comprising a tubular beam member, and knuckle units at either end of said beam member, each said unit comprising a king pin holding portion and an integral closing plate and collar portion positioned over an end of said beam member in a pressed fit relationship and welded thereto at the end of the beam member, said plate also serving to close the tubular beam end.

3. A steering vehicle axle comprising a tubular beam member, and knuckle units at either end of said beam member, each said unit comprising a king pin holding portion and an integral closing plate and collar portion positioned over an end of said beam member snugly engaging said end and welded thereto at the end of the beam member, said plate also serving to close the tubular beam end.

4. A steering vehicle axle comprising a tubular beam member and knuckle units at either end of said beam member, each unit comprising a king pin holding portion and an integral collar portion positioned over an end of said beam member, each said unit having a substantially vertically disposed aperture at either side thereof at the end of the beam member for welding said unit to the beam member.

5. In a steering axle, a collar portion to fit over an end of an axle beam and having a portion to receive and pivotally mount a king pin holding member, said collar portion having a recess conforming to the beam end and an integral base or cover portion to fit over the end of the beam, said base or cover portion and said collar portion being joined together to leave apertures adjacent the edge of the axle beam end whereby they may be welded to the end of the axle beam.

6. In a steering axle, a collar portion to fit over an end of an axle beam and having a portion to receive and pivotally mount a king pin holding member, said collar portion having a recess conforming to the beam end and an integral base or cover portion to fit over the end of the beam, said base or cover portion and said collar portion being joined together to leave apertures adjacent the edge of the axle beam end and lines of welding securing the axle beam end to the base or cover portion and the collar portion.

CHARLES S. ASH.